United States Patent [19]

Valentine

[11] 4,006,538
[45] Feb. 8, 1977

[54] EDUCATIONAL DEVICE FOR LEARNING SWITCHING

[75] Inventor: Charles G. Valentine, Stamford, Conn.

[73] Assignee: Xerox Corporation, Stamford, Conn.

[22] Filed: Apr. 27, 1973

[21] Appl. No.: 355,226

[52] U.S. Cl. .................................. 35/19 A; 35/13
[51] Int. Cl.² ........................................ G09B 23/18
[58] Field of Search ............ 35/8 R, 8 A, 9 R, 9 A, 35/9 B, 9 C, 13, 19 R, 19 A, 30, 48 R

[56] References Cited

UNITED STATES PATENTS

| | | | |
|---|---|---|---|
| 1,286,232 | 12/1918 | Coats | 35/13 X |
| 3,077,696 | 2/1963 | Barnett et al. | 35/19 A X |
| 3,154,862 | 11/1964 | Culpepper, Jr. | 35/19 A |
| 3,203,114 | 8/1965 | Adler | 35/19 A |
| 3,245,156 | 4/1966 | De Blodis et al. | 35/8 A |
| 3,295,226 | 1/1967 | Corcoran | 35/19 A |
| 3,575,545 | 4/1971 | Millar | 35/9 C |
| 3,656,242 | 4/1972 | Atkinson | 35/19 A |
| 3,736,671 | 6/1973 | Oleinick | 35/9 C |

*Primary Examiner*—Anton O. Oechsle
*Assistant Examiner*—Vance Y. Hum

[57] ABSTRACT

An educational kit for teaching a student the basics of switching and of relay operation is disclosed. The kit includes instructional apparatus, and a simulator board which permits the student to match the names of switches with their correct symbols and receive an immediate response as to the correctness of the answer, and design, assembly, and test relay control circuits.

13 Claims, 9 Drawing Figures

AUDIO VISUAL MEANS

FIG. 8

WORK SHEETS

FIG. 9

EDUCATIONAL DEVICE FOR LEARNING SWITCHING

BACKGROUND OF THE DISCLOSURE

1. Field of the Invention

This invention relates to an educational device, and more particularly to an educational kit primarily for demonstrating, illustrating, testing and instructing the basics of switching and relay operation.

2. Description of the Prior Art

A problem of increasing difficulty in the education field is that of providing relatively simple means for instructing students in a particular technology. This problem is particularly acute in community colleges, vocational high schools, trade schools, corporations which offer on-the-job training, in military service training schools, and other special schools where various types of technologies, such as for example, mechanical and electrical technologies, are sought to be taught on a simplified basis. This problem has been accentuated by the large number of new technological fields that have been developed over the past several years, and also by the large number of students seeking to gain knowledge of these fields. These developments, coupled with the high cost and complexity of the various educational devices used in schools to teach these technologies have given rise to a tremendous demand for simple, relatively inexpensive, rugged, easily assembled, relatively portable and easily understood educational devices to teach these technologies.

Furthermore, at some point during the learning process, it is desirable that the student extend beyond textbooks, manuals or diagrams and be afforded the opportunity to see, examine and manipulate the system under study. Physical manipulation of the system aids the student in better understanding what he hears or reads about and therefore complements the entire learning process.

Recent years have marked the introduction of a large number of educational teaching devices aimed at instructing students in various technologies. The most common of these devices are the mechanical or computer devices designed to be used by individual students. The theory behind the increasing use of such devices is that account is made of the individual differences in ability, speed and grasp of subject matter, thereby permitting the student to learn at his own pace and with minimum supervision by the teacher. Some of these devices, such as the video computer type devices, are designed to take over a substantial part of the responsibility for providing and transmitting basic information. Others are designed simply to supplement the teacher's own instructional materials by introducing new dimensions into the learning process whereby, for example, spelling may be associated with pictures of objects, mathematical concepts associated with relative sizes and shapes of objects, or correct responses to questions posed by a computer type device rewarded by permission to proceed. Although numerous efforts have been made to construct simple, relatively inexpensive, rugged, easily assembled, relatively portable and easily understood educational devices, known devices, although satisfactory in some of these respects, do not possess these combined advantages when compared to the novel and advantageous educational kit of the present invention.

Unlike the the prior art devices described in the above references, the present invention is directed to a programmed educational kit which employs a multimedia approach in teaching a relatively sophisticated technology whereby a student can learn by himself by using a simulator board in response to instruction means which is logically keyed to the simulator board.

The advantages of a teaching method using a device geared for the individual whereby both the teacher and the individual may be appraised of the individual's progress are not restricted to the traditional elementary or high school subjects; occupational learning materials that take into account individual differences in ability, speed and grasp of subject matter also have a better chance of being effective. However, at the present time, there are very few effective educational devices available in the community colleges, the junior colleges, the vocational high schools, the trade schools and other special schools where various types of mechanical, electrical, medical or other occupational technologies are sought to be taught on a simplified and individualized basis. There is a great need for programmed instructional materials in the various areas of occupational technology such as for example, electronics, automotive technology, drafting, heating and air conditioning, and in the medical and chemical areas of technology, as well as in the traditional areas of high school study.

SUMMARY OF THE INVENTION

It is therefore an object of the present invention to overcome the disadvantages of the prior art educational devices and to provide an educational kit which is simpler, more durable, less expensive, more easily assembled and still more pleasing from a design viewpoint than prior art devices and otherwise more suitable for use in various types of learning institutions for understanding and acquiring a substantial amount of knowledge about switches and relay operation.

It is a further object of this invention to provide programmed educational kits which present information using a multimedia approach.

It is a further object of this invention to provide an educational kit which is compact when assembled.

It is a further object of this invention to provide an educational kit which is quickly disassembled for easy storage in a very small space.

It is a further object of this invention to provide an educational kit which does not require the student to use a single grommet, screw, bolt, rivet or similar fastening type connection.

It is a further object of this invention to provide an educational kit suitable for teaching students the fundamentals about switching and relay operation including how to design, assemble and test relay control circuits.

It is a further object of this invention to provide an educational kit which enables an instructor to play a more active role in student learning.

It is a further object of this invention to provide an educational kit which enables the student to learn using several forms of communication.

It is a further object of this invention to provide an educational kit which enables the student to participate in different kinds of learning experiences; i.e., the student listens to information while viewing a series of related visuals, such as photographs, drawings, written information, etc., and participates in a manipulative activity.

It is a further object of this invention to provide an educational kit which provides means to test the student while he is learning.

It is still a further object of this invention to provide an educational kit which, in addition to its educational features and mechanical advantages, possesses a pleasing design.

The foregoing objects and others are accomplished in accordance with the present invention by providing an educational kit for teaching electrical switching and relay operation comprising audiovisual instruction means; and a simulator board having graphic indicia on a surface thereof, the board including (i) at a first area on the surface of the board a first plurality of electrical jacks each having in spaced relationship thereto graphic indicia representing an electrical symbol; an equal number of second electrical jacks each having in spaced relationship thereto graphic indicia representing an identification of symbols, each one of the first jacks representing a symbol being electrically connected to one of the second jacks which defines the correct identification of the symbol; and means adapted to indicate the selection of a correct or incorrect match of a symbol and an identification of a symbol; and (ii) at a second area on the surface of the board means adapted to permit a user to assemble and test relay control circuits.

The educational kit in accordance with the invention is designed to teach about switches and relay operation using a programmed multimedia approach whereby the student hears and sees information, performs by answering questions, solves problems and manipulates objects. Each time a student learns something new, he responds to this new knowledge or skill to make sure he has learned it correctly. First, he performs an activity such as by answering a question or solving a problem. Then he finds out immediately if the answer is correct. If the student finds that his answer is correct, this "instant feedback" motivates him to continue learning. If he discovers that his answer is wrong or inadequate, he can stop at that point and find out where his error is.

The educational kit is designed for individual use, use by small groups without the need for extensive supervision or participation by an instructor or use by groups with an instructor. It permits the student to learn at his own pace, and also affords him the chance to capitalize on the way he learns best because he participates in different kinds of learning experiences. He listens to information while viewing a series of related visuals and participates in manipulative activity. He is thus totally involved in the learning process.

BRIEF DESCRIPTION OF THE DRAWINGS

For a better understanding of the invention, as well as other objects and further features thereof, reference is made to the following detailed disclosure of this invention taken in conjunction with the accompanying drawings wherein.

DESCRIPTION OF THE PREFERRED EMBODIMENTS

Figure 1:
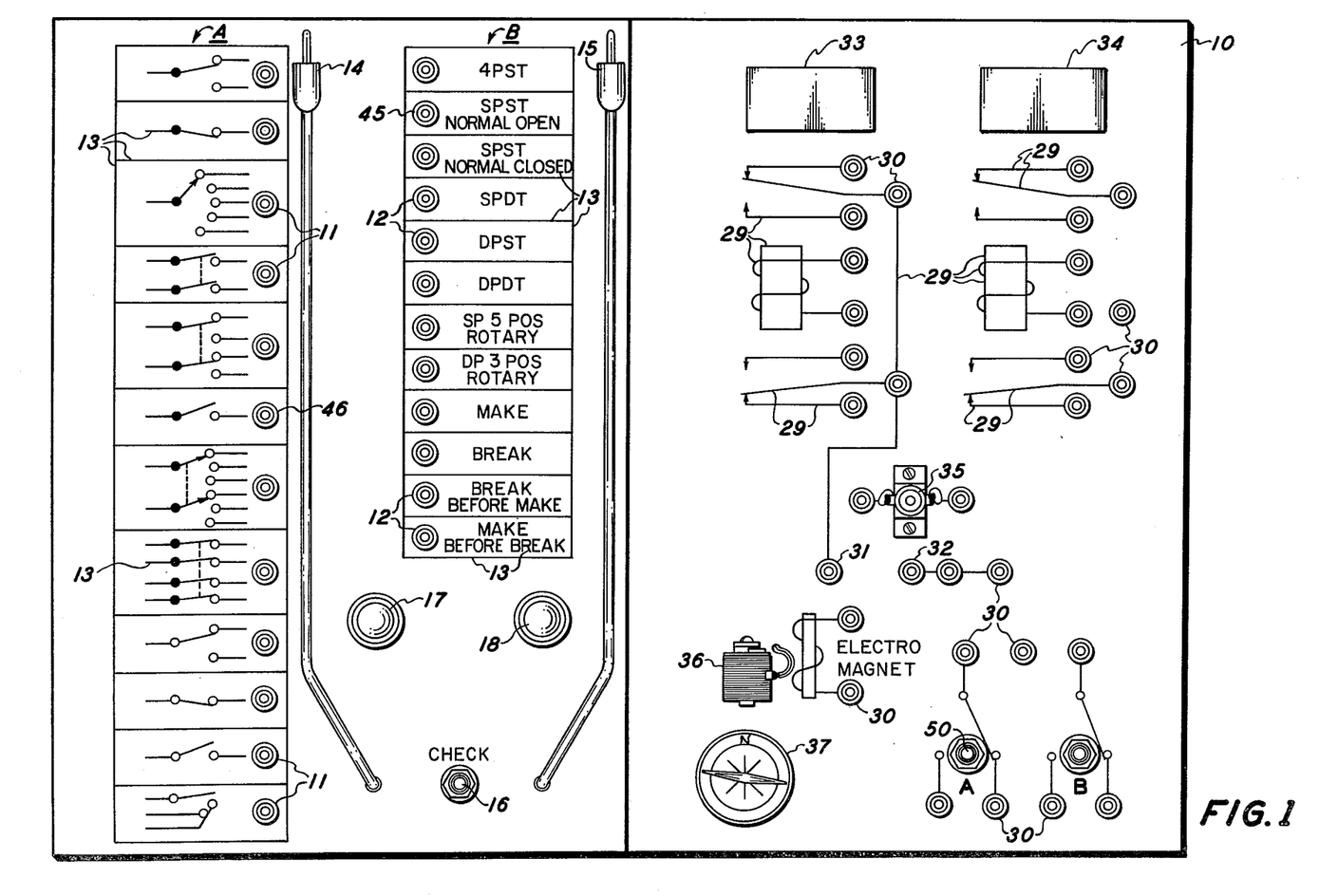
FIG. 1 is a plan view of a preferred simulator board in accordance with the invention.
Figure 2:
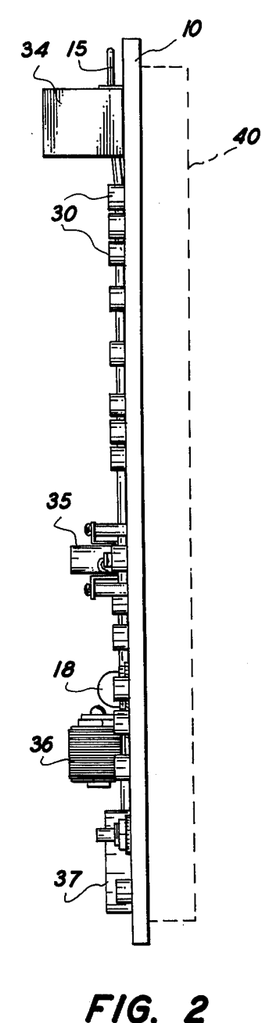
FIG. 2 is a side plan view of the simulator board of FIG. 1.

In FIGS. 1 and 2 there is shown a simulator board 10 which actively allows a student to actually use his hands as a learning tool as well as his eyes and ears. By performing activities using the simulator board, the student takes an active part in the learning process and achieves an understanding of electrical switches and relay operation more quickly.

As shown in FIG. 1, a preferred simulator board 10 in accordance with the invention is shown divided into two distinct sections. The left side of the board represents a first area including a first plurality of electrical jacks 11, preferably female-type jacks, a second plurality of jacks 12, also preferably female-type jacks, and graphic indicia in the form of columns A and B each of the columns having printed therein graphic indicia 13 representative of electrical symbols (column A) and terms that identify the electrical symbols (column B). Examples of the preferred symbols and their corresponding identifications which are on the simulator board are shown in FIG. 1. Although the simulator board 10 shown includes specific graphic indicia 13 imprinted thereon, i.e., certain switch symbols and their identifications, it is to be understood that it is within the scope of this invention to include as graphic indicia on this portion of the simulator board any indicia that may relate to switches and relay operation. This area of the board also includes means adapted to indicate the selection of a correct or incorrect match of a symbol 13 and an identification 13 of the symbol preferably in the form of two phone-type male probes 14 and 15, a push-button type check switch 16 and two indicator lamps 17 and 18. In response to the instructional means, which is preferably presented to the student by an audiovisual presentation in the manner described herein below, the student tries to match each of the symbols in column A with their correct identification in column B or vice versa. For example, the student first can plug probe 14 into one of the jacks 11 having a certain symbol representing a switch in spaced relationship thereto. The student then looks to column B to select the proper identification of the symbol. When the student believes he has chosen the correct response he plugs in probe 15 into the female jack located immediately to the left of the response he has chosen. To find out whether he has chosen the correct or incorrect response, the student presses check switch 16. If lamp 17, preferably colored green, should light, then the student knows that he has selected the correct response. However if lamp 18, preferably colored red, should light, then the student knows that he has chosen an incorrect response and that it is necessary for him to make another choice.

Figure 3:
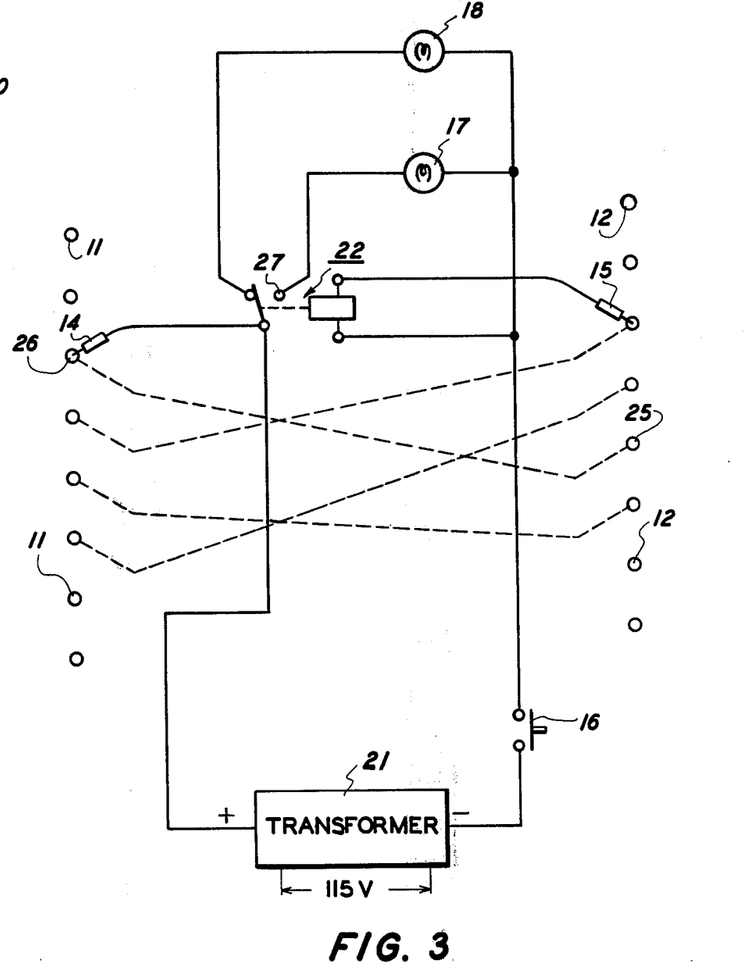
FIG. 3 is an exemplary circuit diagram of the left side portion of the simulator board shown in FIG. 1.

The typical electrical circuitry affixed to the bottom portion of the above-described first area of the board can best be seen in FIG. 3. The power source is supplied from a standard 115-volt outlet directly to a low-voltage transformer 21 (preferably an 8 to 10-volt transformer) which in turn supplies a safe low-voltage current flow to this portion of the board's circuit. Included within this circuit is a push-button type check switch 16, two indicator lamps 17 and 18 which are controlled by an electro-magnetic operated 2-way switch 22. Two probes 14 and 15 are suitably wired to control the electromagnetic switch 22 when plugged into a series of female jacks 11 arranged on the left side of this portion of simulator board (those representing the electrical symbols to be identified) and a series of female jacks 12 arranged on the right-hand side of this portion of the board (those representing the correct identification of the symbol). Probes 14 and 15 act as a switch, and only when two electrically connected female jacks, i.e., a female jack representing a symbol and a female jack 12 representing the correct identification of the symbol, are plugged into at the same time will the electromagnet be energized to operate the two-way switch 22 to complete the circuit to lamp 17 which in turn would light upon pressing check switch 16. The circuit is constructed such that the two-way switch 22 is normally closed to operate lamp 18. Thus, the choice of any other than the correct answer will result in lamp 18 lighting whenever check switch 16 is closed. For example, when probes 14 and 15 are plugged into the female jacks as shown in FIG. 3 and check switch 16 is depressed, switch 22 remains in the position as shown, thus completing the circuit including lamp 18 which in turn lights thereby indicating a wrong answer. However, if probe 15 is inserted into female jack 25 which represents the correct identification of the symbol represented by female jack 26 (note that jack 25 is wired to jack 26), and check switch 16 is depressed, then switch 22 opens to position 27 thereby completing the circuit to light lamp 17.

The right side of the board represents a second area which allows a student to learn about the basics of relay operation by providing means that enables the student to design, assemble and test relay control circuits in the manner as described herein below. As shown in FIG. 1, this portion of the board includes a plurality of mounted electrical jacks 30, preferably female-type jacks, which extend through the board to the bottom portion thereof. Two jacks 31 and 32 are provided for connecting a voltage source, e.g., a D.C. power supply unit, to this portion of the board. Male connecting leads 60 similar to those shown in FIG. 7 can be used to supply the voltage from the power source to each of jacks 31 and 32. Connecting several of the jacks is graphic indicia 29 which represents simulated wiring and electrical symbols of some of the electrical components secured to the board. The electrical components secured to the top portion of a preferred board in accordance with the invention are relay switches 33 and 34, lamp socket 35, and electromagnet 36. Positioned close to the electromagnet is a compass 37. On the bottom portion of the board jacks 30 are electrically connected by wire in the manner as depicted graphically by the indicia appearing on the top of the board. Also switches A and B depicted graphically on the top of the board are secured to the bottom portion of the board and electrically wired to certain jacks as shown graphically in FIG. 1. Although relay switches 33 and 34 are shown covered, it is preferred to use exposed relay switches on the board so that a student can observe their operation. The entire electrical package found on the bottom portion of the board is designated as 40 in FIG. 2.

Figure 7:
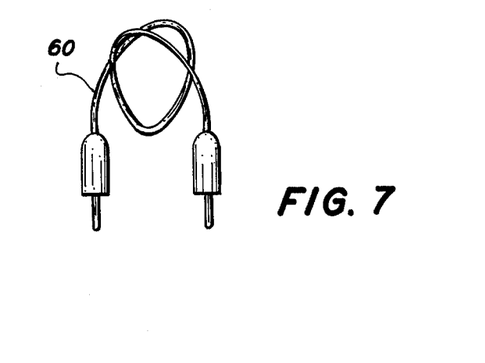
FIG. 7 is a plan view of preferred male connecting leads.
Figure 8:
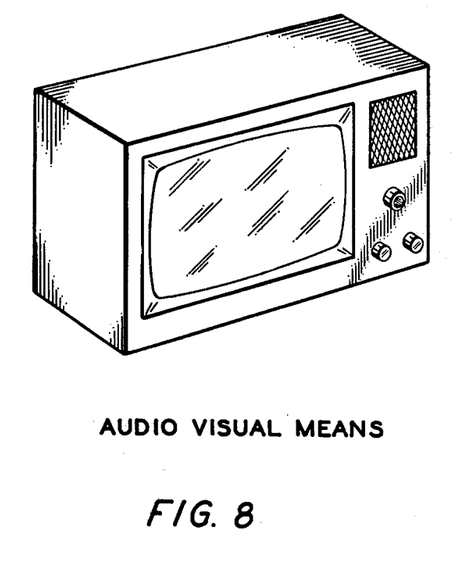
FIG. 8 illustrates generally an audiovisual device suitable for use in the present invention.
Figure 9:
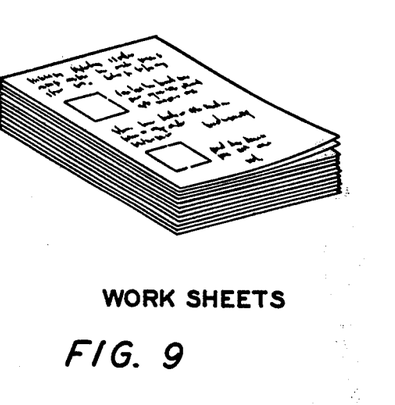
FIG. 9 illustrates generally worksheets in accordance with the present invention.

FIG. 7 is representative of one of several male-type connecting leads 60 which are used with the educational kit of the present invention. The sizes of the connecting leads used with the board can vary, but it is preferred to use various connecting leads ranging in size from 6 to 18 inches.

The simulator board 10 can be constructed by numerous methods. For example, the board can be constructed of a sheet of ferrous metal, such as for example, galvanized steel or a plastic, over which is painted a neutral background color, such as for example, a yellow or white enamel. The graphic indicia present on the board can then preferably be printed over the enamel background in a suitably contrasting color, such as for example, black. The printing may be accomplished by any suitable means, such as for example, a silk screening process. Although the simulator board may consist solely of a thin sheet of metal with suitably smooth edges, the sheet is preferably laminated to a suitable backing member, which imparts a desirable rigidity thereto and also allows the simulator board to be conveniently handled. Thus, in one preferred embodiment of this invention, the simulator board comprises a thin sheet of metal having a thickness of about 1/32 inch laminated to a backing member made from a rigid material such as fiber board, or a resinous material the backing member having a preferred thickness of about ¼ inch. The edges of the completed board can be covered with a plastic material to obtain a neat appearance and also to avoid the problem of having sharp edges. The simulator board can also be constructed of a sheet of a rigid material such as a polymeric material, for example, a vinyl material. In this embodiment, the background color and graphic indicia are placed on the material as described above. The dimensions of the simulator board should be such that the board can be conveniently used by the student at a given workplace. Boards having dimensions of about 15 × 20 inches, or approximately 300 square inches, are particularly suitable.

Various kinds of instructional means can be employed with the educational kit in accordance with the invention. For example, one of the preferred embodiments for instructional means is an audiovisual presentation using slides or film strips in conjunction with a descriptive audio account of the visuals, such as an audio cassette. The visual materials are synchronized with the audio presentation. The audiovisual portion makes it possible for a student to learn by listening to a description while seeing what is being described. A recorded narrator provides background information, describes equipment, or explains principals of operation while a series of illustrated visuals (photographs, graphs, drawings written material, etc.) is shown to the student synchronized with the audio presentation. The narrator also tells the student, for example, how to proceed; whether to observe something that is being shown to him, to perform an activity on the simulator board 10, or to complete a question or problem on the student's worksheet; he suggests points at which the student might ask for help and, along with the visual portion provides answers to the questions or information about the simulator or equipment. The audiovisual presentation is stopped each time the narrator asks the student to do something. The student starts the sequence again after he completes the activity.

The audiovisual equipment needed, of course, will vary depending on the type of instructions to be given. A rear screen projector for small groups, or a projector and screen for a classroom presentation may be used. For the audio presentation either visual projection equipment with built-in audio capability or a separate cassette recorder may be used. The audio presentation may be on, for example, cassettes, and the visual portion on, for example, 35 mm film strip or slides.

In order to give the student an additional opportunity to check his grasp of the material he is learning, the student is called upon throughout the unit to construct definitions, label components, answer questions, and solve problems. To achieve these objects the kit preferably includes work sheets that restate the question or problem and provide working space and answer blanks. The work sheets are preferably laminated so that the student can easily erase an answer and redo a problem with the added advantage that the sheets can be cleaned off for use by another student. The work sheets are also beneficial in telling the instructor about a student's work habits and whether or not he is benefiting from the kit. In addition, an instructor's review of the work sheets can help him locate the point at which the student is having difficulty.

All of the above materials can be conveniently housed in a compartment-like case for easy use and storage. Thus, the educational kit which can include the simulator board 10, the instructional means, such as video slides or tapes, the audio cassettes, and the work sheets, can all be contained within one case. The kit may also include sample tests or quizzes which can be given by the instructor before and after use of the program and an instructor's manual.

An example of how a preferred embodiment of an educational kit in accordance with the present invention may be used to teach about the basics of switching and of relay operation is as follows: The audiovisual presentation being with a general description of the basics of switching, i.e., the controlling of either voltage or current, emphasizing the various electrical symbols found in switching circuits. This is presented to the student so that he can identify the operating controls of switching circuits on electrical circuit diagrams. The presentation emphasizes associating the symbol used for a switch in an electrical circuit diagram with the physical switch itself.

During the audiovisual presentation, as the student is introduced to various concepts, terms, definitions, etc. he may be asked to copy certain of these items in his work sheet. During the presentation, the student is also referred to his work sheets to solve various problems and answer various questions. For example, after the student is introduced to various symbols used for various types of switches, he might be shown the symbol used for a particular switch on the slides and then asked to record in his work sheets the functions of the switch shown to him. Thereafter, the audiovisual presentation would give the correct answer to the student for him to check with the answer that he has written on his work sheets.

The presentation continues by presenting to the student various switching arrangements, in each instance giving the name for the switch, its function and the symbol used for the switch in a circuit diagram. For example, the student is shown on the slides a switch which is identified as a single pole, single throw, normally open switch usually abbreviated as SPST (N.O.). During the presentation, the slides not only show pictures of the actual switches, but also the electrical symbols used for the particular switch under discussion, and examples of electrical circuit diagrams containing the particular symbol being discussed. The instructional material is presented to the student by means of visual slides and a synchronized audio presentation.

At certain points during the presentation, the student is asked to turn to the simulator board. At first the student is referred to the left side of the board, as shown in FIG. 1, where he is asked to identify the correct symbol, as found in column A, for the various switches and terms found in column B. For example, on the audio portion the student is told to use the simulator board and correctly identify the switch symbol for an SPST normally open switch. Thereafter, the student takes probe 15 and plugs it into female jack 45 which corresponds to the term SPST normally open in column B. The student is then referred to column A on the board, i.e., the column containing a plurality of female jacks 11, each jack representing graphic indicia defining the symbol for a particular switch or term, and is asked to correctly identify the symbol for a SPST normally open switch. After making his selection, the student uses probe 14 and inserts it into the female jack corresponding to the symbol he has chosen. The student then presses check switch 16 to determine if he has chosen the correct symbol. If his choice is correct, lamp 17 will light, but if lamp 18 lights, he is told to make another choice. By inserting probe 15 into female jack 46, the student will be immediately informed upon pressing check switch 16 that he has selected the correct symbol for a SPST normally open switch. In a like manner, the student can identify each of the terms in column B with the correct symbol for the term as shown in column A on the simulator board. Alternatively, the student can reverse this order and use this portion of the simulator board to identify each of the symbols in column A with the terms identifying these symbols as shown in column B.

In the next portion of the program, the student's attention is directed beyond the manually controlled switches covered in the first portion of the program and specifically to the basics of relay operation. Upon completion of this portion of the program, the student will be able to describe relay operations for switching; draw the symbols and identify the four basic relay contact arrangements; describe two methods of holding relays in operating position after the initial operating energy is turned off; draw a circuit that will enable a relay to lock up through its own contacts; and trace through relay contacts on a schematic with the relay operated or released.

Figure 4:
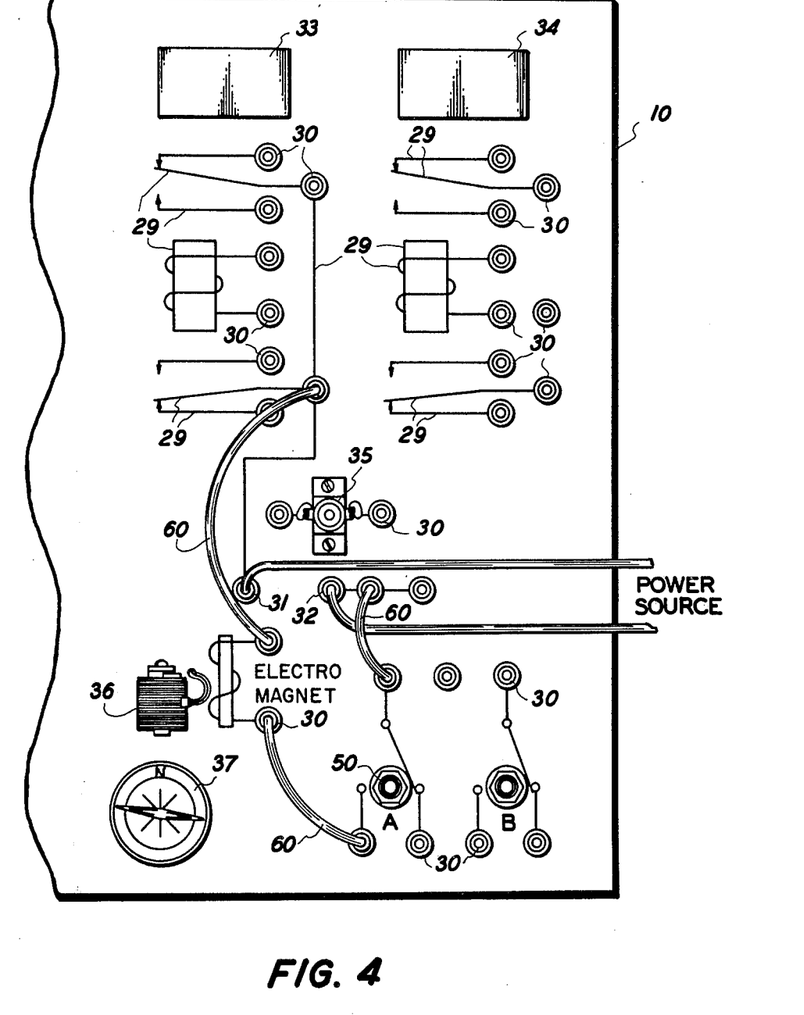
FIG. 4 is a sectional view of the simulator board shown in FIG. 1 with several male connecting leads in place.

The audiovisual presentation continues with a general discussion of the function and operation of electrically operated switches which are generally called relays. First, the fact that relays generally use electromagnets to provide the operating force for the relay and that the electromagnet consists of a steel core with a number of turns of wire wound around it is discussed. The student is also informed that if the source of voltage or current is connected to the winding, the current will establish a magnetic field around the core. Thereafter, and in conformity with this discussion, the student is referred to the right side portion of the simulator board. The student uses the simulator board to observe the formation of a magnetic field in a relay type circuit. In order to make this observation, the student is told by the audiovisual presentation to set up a circuit on the board using a plurality of male connecting leads as shown in FIG. 4 which includes switch A and electromagnet 36. After turning on the power supply the student is told to operate switch A by pressing button 50 while observing the position of the compass needle in compass 37. The presentation explains that the presence of a magnetic field around the core is indicated by the changes in the compass needle position. Thereafter, the audiovisual presentation explains that in a complete relay, this magnetic field attracts an iron plate or bar, called the armature, toward the core. This magnetic attraction provides the force to move the contacts in a relay to the operated position. At this time, the slides show the names and symbols for the moving contact and the fixed contact.

Figure 5:
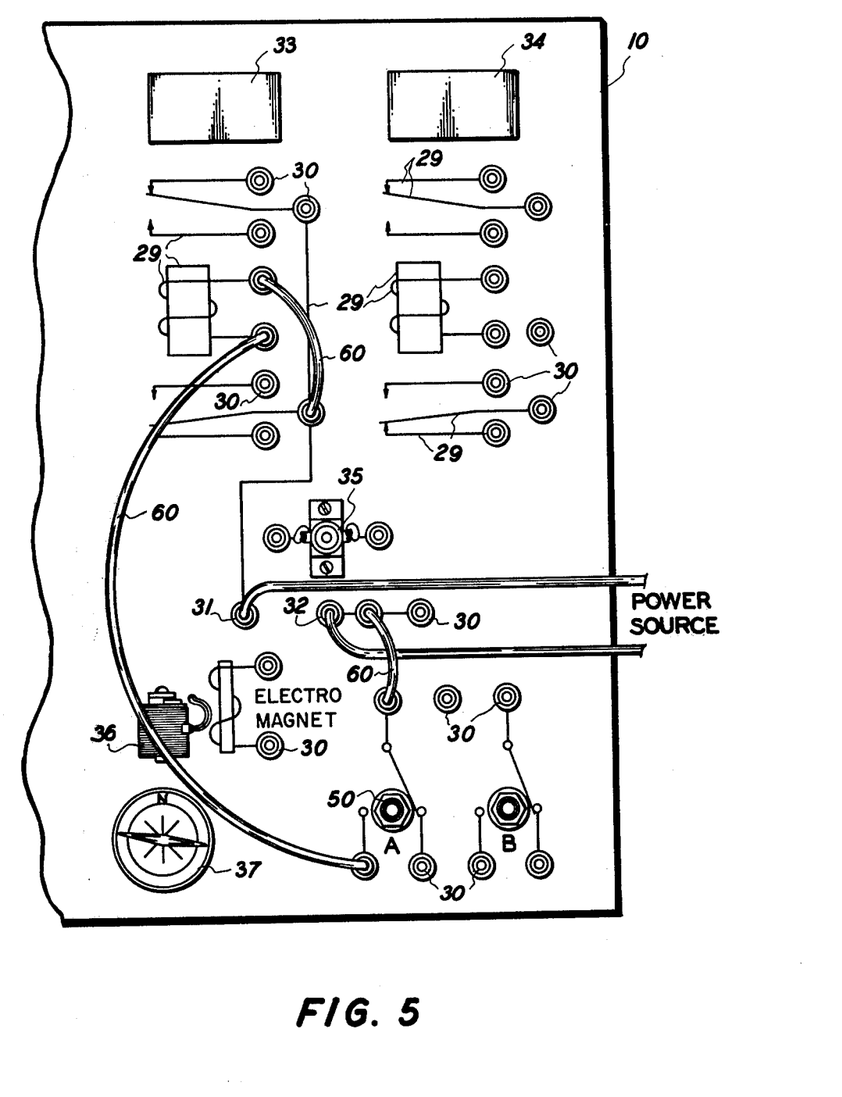
FIG. 5 is a second sectional view of the simulator board shown in FIG. 1 with several male connecting leads in place.

Another way that the student can use this portion of the simulator board to observe a relay switch in operation is by moving the two male connecting leads connected to the electromagnet 36 as shown in FIG. 4, to the proper jacks by the relay 33 to form a circuit including relay 33 as shown in FIG. 5. The center tap of each set of relay contacts shown on the board receives power from the power supply input jacks 31 and 32. The student then operates and releases switch A by pressing button 50 several times and notes that the armature of relay 33 mounted at the top of the simulator, pulls towards the core and releases in response to switch operation.

The presentation next focuses on the various advantages of relays which are discussed in detail including the ability of relays to be remote controlled; the ability of a low voltage, low current core winding to control very high voltage, high current contacts; the fact that a simple SPST switch can control many circuits at the same time by means of multiple contacts on the relay; the fact that relays may be connected in parallel and several can be operated from a single switch; and the fact that it is possible to control one relay from several switches in several different locations by wiring these switches in a parallel circuit. At the same time that the audiovisual presentation presents a detailed discussion of the relay switch, the student is referred to uncovered relay switches 33 and 34 on the simulator board. In this regard, the student's attention is specifically directed to various items on the relays, including, for example, the contacts, the manner in which the contacts are arranged around the core, and the fact that there are two sets of contacts on the relay.

Figure 6:
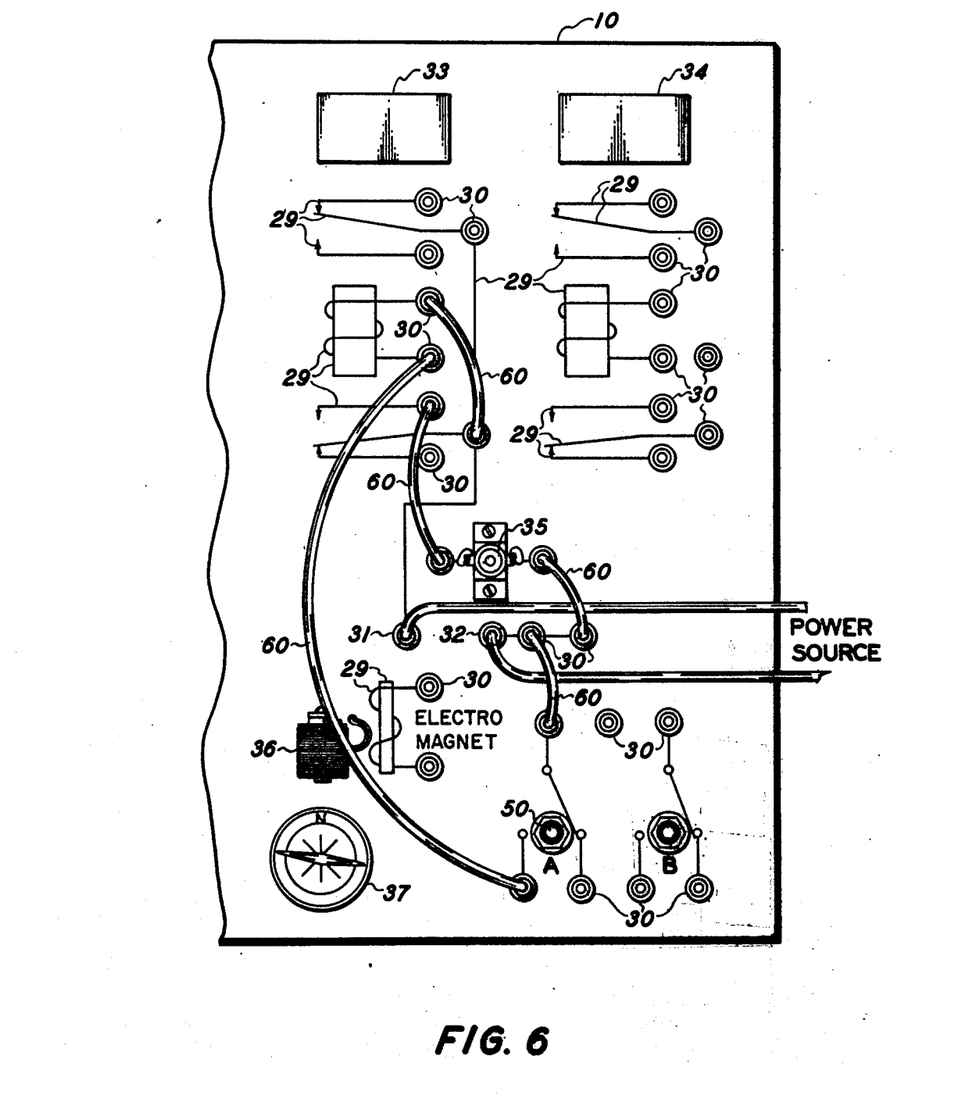
FIG. 6 is a third sectional view of the simulator board shown in FIG. 1 with several male connecting leads in place.

The student is then shown on the slides a non-locking relay circuit diagram and is asked to construct the same circuit on the simulator board including socket 35, which he is told might represent some remote load such as a fan motor or a light that is controlled by the relay. An example of how the student uses the simulator board to construct this type of circuit is shown in FIG. 6. After constructing this circuit on the board, the student is told to turn on the power supply at 5 volts output. By operating switch A, the student notes that relay 33 operates and socket 35 which includes a bulb lights. The student is told that since this is a non-locking relay circuit, the lamp will go out when the switch is released. In a similar manner, the student can connect an operating path for relay 34 including (1) a circuit which will operate relay 34 upon pushing switch A, (2) a circuit containing relay 34, switch A and socket 35 which will cause a bulb to light as the relay operates upon pushing switch A and also which will cause the bulb to go out as a switch A is released, and (3) a circuit including switch A, relay 34, socket 35 and a locking path such that when the student pushes switch A, relay 34 operates and the bulb will light, but when the student lets up on switch A the relay and the lamp stay operated. The student is informed that switch B is not connected on the simulator. However, if the student checks the simulator he will note that the only way to release the relay is to disconnect one of the leads in the locking path. This would be impractical in a real circuit, since all connections are usually soldered. Therefore, switch B is used to turn off the circuit or open the locking path and release the relay. Thus, on the simulator the student takes the male connecting lead from the movable make contact in the locking path and connects it to the break contact on switch B. Thereafter, the student pushes switch A and the relay operates and locks. However, by pushing switch B the student releases the circuit.

In a similar fashion as described above, the audiovisual presentation presents to the student a complete description of the basics of manually controlled switches and relay operation. During various portions of the audiovisual presentation the student uses the simulator board and the work sheets in the manner described above. The above-described educational kit is programmed such that the student will encounter a minimum of frustration and a maximum of learning efficiency while using the kit.

After using the educational kit in accordance with the present invention, the student will understand the basics of switching and of relay operation, and will be able to define and give the purpose for a switch and a relay; describe and give an application for the following special switches: knife, micro, and rotary; describe the following characteristics of relay or switch contacts: current relay, materials, make, break, transfer including make before break and break before make, troubles such as burning and pitting, and wider sections; describe the operation of a relay; describe two ways of locking a relay operated mechanically and electrically through a locking circuit; locate the operating path for a relay winding in an electrical schematic diagram; and trace the circuit paths on a schematic diagram to show how relay and switch contacts control current and voltage in electrical systems.

Details of the various methods by which students can use the educational kit of this invention are explained in detail in "Occupational Technology Series, Electronics Technology, Switching, Unit 11109-81" published by the Xerox Corporation.

I claim:
1. An educational kit for teaching electrical switching and relay operation comprising in combination:
   a. audiovisual instruction means for presenting information relating to electrical switching and relay operation said instruction means including a plurality of identified questions and/or answers relevant to subject matter concerning electrical switching and relay operation; and
   b. a simulator board having graphic indicia on a surface thereof, said board including (i) at a first area on the surface of said board a first plurality of electrical jacks each having in spaced relationship thereto graphic indicia representing a symbol of an electrical switch or relay; an equal number of second electrical jacks each having in spaced relationship thereto graphic indicia representing an identification of said symbols, each one of said first jacks representing a symbol being electrically connected to one of said second jacks which defines the correct identification of said symbol; a first probe adapted to be inserted into said first jacks in response to said instruction means; a second probe adapted to be inserted into one of said second jacks; a check switch; and first and second indicator lamps, whereby the correct matching of a symbol for an electrical switch or relay with indicia representing an identification of said symbol may be obtained by insertion of said probes into said jacks in response to said instruction means; and (ii) at a second area on the surface of said board a plurality of electrical components mounted on said board including relays and switches, the symbols for all of the relays and switches mounted on the second area of said board being graphically depicted on the first area of said board, said components comprising first means adapted to allow the user of said kit to observe the formation of a magnetic field in a relay type circuit; a second means adapted to allow the user of said kit to observe a relay switch in operation; and third means adapted to permit a user to assemble and test relay control circuits, the user of said kit employing said first, second and third means in response to instructions given by said instruction means.

2. An educational kit according to claim 1 wherein said first and second jacks are arranged in columns, said electrical symbols by each of said first jack, being symbols for switches.

3. An educational kit according to claim 1 wherein the first area of said board includes a transformer adapted to reduce standard outlet voltage.

4. An educational kit according to claim 1 wherein said audio instructional means includes tape recordings which are synchronized with said visual instructional means which includes slides or film strip.

5. An educational kit according to claim 1 wherein said kit includes a plurality of student work sheets, said work sheets being adapted for use by the student to record information and test the student in response to said audiovisual instructional means.

6. An educational kit according to claim 1 wherein said simulator board is constructed of a substantially rigid material.

7. An educational kit according to claim 1 wherein said first means comprises a switch, an electromagnet, and a compass, said compass being in relative position to said electromagnet such that the compass can indicate a change in the magnetic field surrounding said electromagnet.

8. An educational kit according to claim 1 wherein said second means comprises a relay and a switch, the internal operating portions of the relay being exposed to the user of the kit such that the user can observe that the armature of said relay pulls towards the core of the relay and releases in response to said switch operation when the relay is used.

9. An educational kit according to claim 1 wherein said third means comprises at least one relay switch, a light bulb socket, at least one manually operated electrical switch and a plurality of electrical jacks.

10. An educational kit according to claim 9 further including a plurality of connecting lead wires adapted for insertion in said jacks to provide a complete electrical path such that electrical circuits including said electrical components can be constructed on said board.

11. An educational kit according to claim 1 wherein said second area of said board includes a pair of electrical jacks, said jacks adapted to connect a voltage source to the second area of said board.

12. An educational kit according to claim 1 wherein said audiovisual instruction means includes visual and audio instructional portions terminating in audio directions to the user of said kit to perform a manipulative activity using said simulator board, said instructional means stopping upon completion of said audio directions and being restartable by the kit user upon completion of said manipulative activity.

13. An educational kit according to claim 1 wherein the second area of said board includes graphic indicia identifying said components.

* * * * *